Dec. 28, 1954 C. W. HOYT 2,698,357
SIGNAL DETECTION AND AUTOMATIC GAIN CONTROL CIRCUIT
Filed March 1, 1950
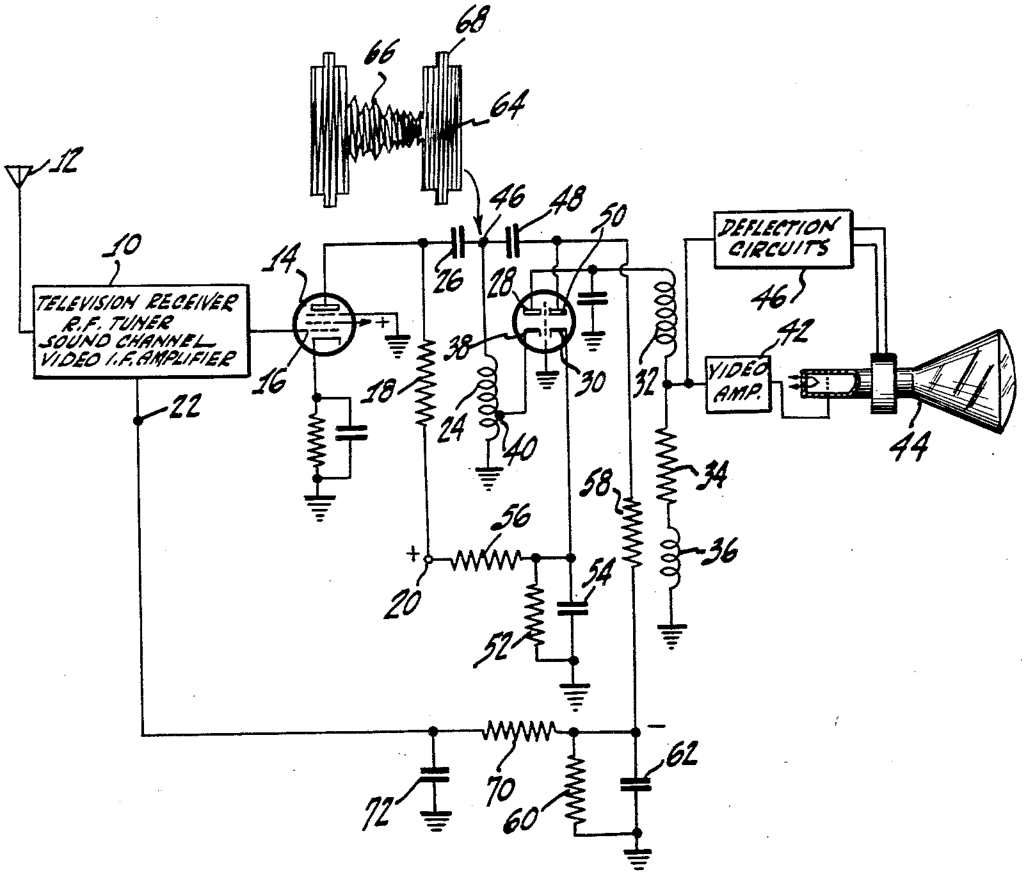
Inventor
Clyde W. Hoyt
By
Attorney

United States Patent Office 2,698,357

Patented Dec. 28, 1954

2,698,357

SIGNAL DETECTION AND AUTOMATIC GAIN CONTROL CIRCUIT

Clyde W. Hoyt, Pennsauken Township, Merchantville, N. J., assignor to Radio Corporation of America, a corporation of Delaware Application March 1, 1950, Serial No. 147,036

6 Claims. (Cl. 178—7.3)

The present invention relates to signal detecting systems, and more particularly, although not necessarily exclusively, to combination type signal detecting systems wherein more than one form of signal detection can be derived from a single signal amplifier.

Even more directly, the present invention is involved with an improved signal detecting arrangement which is differential in its loading action. That is to say, when used in connection with AM modulated radio carriers, the present invention allows demodulation and peak detection of the same signal from the output of a single amplifier. The present invention permits the effective gain of a single amplifier to appear greater for the peak detecting action than the gain which appears for the demodulating action.

Because of this latter effect, the present invention is very useful in television receivers having automatic gain control systems. The peak detection of the television signal may be used to develop an automatic gain control potential. On the other hand, the demodulation action of the present invention may be used to demodulate the video signal from the television carrier. The differential loading provided by the present invention allows the AGC potential developed to reflect a higher effective AGC gain than is conventionally obtained with a similar number of circuit elements.

It is well known in television practice that the composite television signal used for modulating a television transmitter is complex. It has several parts. The video signal part of the composite signal represents rather low amplitude modulation of the television transmitter. On the other hand, the synchronizing pulse portion of the television signal represents rather high amplitude modulation of the television transmitter.

In television receiver design an effort is made to amplify the modulated radio signal as much as possible before it is demodulated. Practical considerations limit the amount of amplification possible. For instance, cost of the amplifier itself becomes excessive when too much gain is attempted. One of the reasons for this cost is, of course, the relatively wide band width required by television signals. Some television receivers employ an automatic gain control feature. That is, the gain of a signal amplifier is automatically varied in accordance with received signal strength. This gain control is carried on so as to make the amplitude of the signal appearing at the output of the amplifier almost constant regardless of input signal strength variations.

To obtain near perfect or "smoothest" automatic gain control operation considerable amplification of any variation in the signal must be accomplished. The amount of amplification required is usually greater than that normally given to the incoming signal before demodulation. Thus, in the past, it has been common practice to provide special automatic gain control amplifiers in television receivers. These special amplifiers make up for the lack of gain provided by the regular signal amplifiers. Generally, these special AGC amplifiers are required to handle only D. C., or at most, narrow band width pulse information.

It is, therefore, an object of the present invention to provide a signal detecting arrangement which will establish higher effective preamplification gains for some portions of the detected signal than for other portions of the detected signal.

It is another object of the present invention to provide an improved signal detector arrangement in television receivers utilizing automatic gain control circuits.

In the realization of the above objects and features of advantage, the invention may take many forms. In its particular application to television receivers, the present invention uses a tapped impedance element which may take the form of inductance. The inductance is tapped at a high impedance level and a low impedance level. Signal energy in the television receiver before demodulation is applied to the inductance. A first diode and a connected load circuit is placed across the low impedance taps of the inductance. This provides a demodulator for the video signal part of the television signal. An automatic gain control circuit is then placed across the high impedance taps of the inductance. This automatic gain control circuit may be nothing more than a second diode with a connected load circuit. Bias means are provided in series with the second diode so as to keep it from conducting except on peaks of television signal synchronizing pulses. The voltage developed across the second diode load then is a measure of the received signal intensity. Therefore, this voltage may be used as an automatic gain control potential for the television receiver. The higher impedance signal source for the AGC detector gives an effective boost to the overall AGC gain. This is done without effecting the proper impedance match of the signal demodulator diode to the amplifier feeding the tapped inductance.

A better understanding of the present invention as well as other objects and features of advantage will become apparent from a reading of the following description, especially when taken in connection with the accompanying drawing, which drawing illustrates by a combination block diagram and schematic representation, one embodiment of the present invention as applied to a conventional television receiver.

Turning now to the figure, there is indicated at 10 a television receiver having an RF tuner, sound channel and video IF amplifier. Details of circuits for such purposes are shown in an article entitled "Television Receivers" by Anthony Wright appearing in the RCA Review for March 1947. Signals picked up by the antenna 12 are amplified by the RF tuner and converted to an IF frequency. This IF frequency is amplified by those video IF amplifiers in the block 10. For purposes of illustration, however, an additional video IF amplifier is indicated by the discharge tube 14. Video IF signals from the previous amplifiers in block 10 are applied to the grid 16 of the tube 14. Anode potential for the tube 14 is derived through a resistor 18 from B+ source 20. An automatic gain control terminal 22 is also indicated. This terminal is intended to receive a control voltage which will vary the amplification of the gain of the television receiver 10. If this gain is varied in the proper manner, the voltage applied to the grid 16 of tube 14 will be almost constant over a wide range of signal strengths reaching antenna 12.

According to the present invention, the IF signal appearing at the upper terminal of load resistance 18 is coupled to a tapped inductance 24. This is done by means of capacitor 26. The left-hand diode 28 of the double diode envelope 30 is then used as a video signal demodulator. This is accomplished by putting the diode 28 in series with another inductance 32, resistance 34 and still another inductance 36. These elements may be thought of as a demodulator combination. It is well known that care must be taken to provide the proper degree coupling between the video IF amplifier 14 and the diode 28. A proper impedance match may be accomplished by tapping the cathode 38 of the diode 28 down along the inductance 24. Its connection to the inductance 24 is shown at 40. Should the tap 40 be moved to the upward extremity of the inductance 24, the discharge tube 14 would be overloaded and the frequency response of the video IF amplifier may be impaired.

The video signal demodulated by the diode 28 is applied, of course, to a video amplifier 42 which, in turn, drives the grid of an image reproducing tube 44. The demodulated signal appearing at the output of the video amplifier 42 may be also used to synchronize the deflection circuits 46. Details of suitable circuits for use in blocks 42 and 44 are also shown in the above-identified article by Anthony Wright entitled "Television Receivers."

With the inductance 24 connected as shown in accordance with the present invention, the voltage at the upper terminal 46 thereof will be much greater than that available at the terminal 40. Thus, at first blush, it might appear that full advantage was not being taken of the output of the amplifier 14. But, as mentioned before, an attempt to use this full voltage would only result in overloading the tube 14. This would not only impair the characteristics of the video IF amplifier, but would, in fact, actually reduce the voltage presently available at terminal 46. Thus, from the video signal standpoint the gain of the television receiver is pretty well defined at its useable maximum. Unless additional amplifier tubes were used, no additional gain up to the grid of the video amplifier 42 can usually be realized.

However, according to the present invention, the higher signal voltage across inductance 24 is used to good advantage. The signal voltage appearing thereacross is coupled through capacitor 48 to the right-hand diode 50 of the envelope 30. This diode is connected in series with a load circuit made up of resistor 52 in shunt with capacitor 54. A positive bias is placed in series with the diode 50 by the bleeder 56. The bleeder 56 causes a net positive voltage to be developed across resistor 52 which, of course, biases the diode 50 in the non-conducting direction. The rest of the load circuit for the diode 50 is made up of resistor 58, resistor 60 and capacitor 62. This bias is adjusted so that the diode 50 will only conduct on peaks of sync. For example, the waveform 64 shows the video IF signal across the inductance 24. The video signal component is shown at 66 while the synchronizing component is shown at 68. By biasing off the diode 50, it will be seen possible to allow conduction therethrough only by the peaks of sync 68.

With the above connections and adjustments, a voltage will be developed across resistor 60 which will be negative with respect to ground. The magnitude of the voltage across resistor 60 will be directly proportional with the amplitude of the received signal as measured by the positive peaks of sync 68. The potential thus developed may be thought of as an AGC potential and conducted through resistor 70 and bypassed by capacitor 72 for application to the AGC terminal of the receiver 10.

This general peak detecting form of developing an AGC potential is, of course, old in the art. However, the particular advantages of the circuit arrangement of the present invention gives a considerable boost to the effective gain of the AGC system. This, of course, follows in the light of the previous description in which it was noted that the voltage across the total inductance 24 was much greater than the voltage appearing across the tap 40 to ground.

The present invention takes advantage of the fact that the AGC rectifying or peak detecting system requires very little power, once the capacitor 62 has built up a charge substantially equal to the peak of sync 68. Thus, the connection of the AGC circuit across the total inductance of the inductor 24 does not overload the video IF amplifier 14 during normal operation of the receiver. Experimental results show that practical application of this novel circuit to conventional receivers easily doubles or trebles the flatness of the signal fed to the video amplifier 42 for a given fluctuation of receiver input signal strength.

It is noted that the diodes 28 and 30 operate on opposite polarity halves of the video carrier 64. That is to say, the video signal demodulated by the diode 28 corresponds to the negative going excursions of the carrier 64. On the other hand, the sync pulses peak detected by the diode 50 are obtained from the positive going excursions of the carrier 64. It is, of course, possible to reverse the polarity of either the diode 50 or the diode 28 to make both the AGC system and the video demodulation work from the same polarity of carrier excursion. Under such conditions, certain conventional modifications of the rest of the receiver would have to be made.

It is further obvious that the inductance 24 although being shunt fed through the capacitor 26 could be incorporated directly in the anode circuit of the discharge tube 14. In such event, adjustments would have to be made in the demodulating circuit for the positive potential that would appear on the inductance 24. Moreover, in the practice of the present invention, the inductance 24 is so chosen to resonate with the associated circuit capacity at some particular frequency. This frequency is selected in accordance with the demands of the particular video IF amplifier. In staggered tuned IF amplifiers, the inductance 24 would resonate with the stray circuit capacity, taken in combination with capacitors 26 and 28, at some frequency different from the other resonant frequencies of previous IF amplifiers.

Having thus described my invention, what I claim is:

1. In a radio receiver adapted to receive and demodulate a radio carrier modulated with an intelligence signal and a pulse component, said pulse component corresponding to maximum excursions of the radio carrier and said intelligence signal corresponding to carrier excursions of less amplitude and has said pulse component, in combination, a signal amplifier connected for amplifying a version of said received signal prior to demodulation, said amplifier employing an output electron discharge tube having an anode and a cathode between which is connected an output load circuit, an inductance having low impedance taps and high impedance taps, means for coupling energy from said amplifier output circuit to said inductance, a first diode connected in series with a first load circuit to form a detecting circuit combination, connections placing said first detecting circuit combination between the low impedance taps of said inductance such to demodulate intelligence signal across said first load circuit, a second diode connected in series with a second load circuit to form a second detecting circuit combination, connections placing said second detecting circuit combination between the high impedance taps on said inductance, biasing means connected in series with said second detecting circuit combination of such polarity to prevent conduction of said second diode for all carrier excursions below the amplitude of said pulse component so as to demodulate only high amplitude carrier excursions, and means for controlling the value of low amplitude signal applied to said first detecting circuit combination by the high amplitude signal demodulated by said second detecting circuit combination.

2. Apparatus according to claim 1 where said signal amplifier is of the staggered tuned variety employing a plurality of tuned circuits and wherein said tapped inductance is resonated by electrical capacity to form one of the tuned circuits of said staggered tuned amplifier.

3. In an electrical signal channel adapted to communicate an amplitude modulated radio carrier, said carrier being modulated with a low level signal intelligence and a relatively high level pulse component, the excursions of said pulse component exceeding the maximum excursions of said signal intelligence, in combination, means for controlling the gain of said signal channel in accordance with a control voltage, a signal amplifier for communicating signal intelligence when demodulated from said radio carrier, an electron discharge tube amplifier having at least a grid input circuit and a plate output circuit, coupling from the output of said signal channel to said grid input circuit, an inductance element having low impedance taps and high impedance taps, coupling from said discharge tube plate output circuit to said impedance element, a first diode connected in series with a first load circuit to form an intelligence signal demodulator, connections placing said signal demodulator between the low impedance taps of said inductance to demodulate intelligence signal, means for coupling said demodulated intelligence signal to the input of said signal amplifier, means for developing a control voltage for said gain controlling means in accordance with the peak carrier excursions corresponding to said pulse component, said voltage developing means being responsive only to said pulse component excursions and having input terminals for receiving carrier pulses and output terminals for delivering control voltage, connections from said developing means input terminals to the high impedance taps of said impedance element and connections from the output terminals of said voltage developing means to the input of gain controlling means whereby variations in pulse carrier amplitude are carried to control the amplitude of signal delivered to said first signal demodulator.

4. Apparatus according to claim 3 wherein said control voltage developing means includes a second diode connected in series with a second load circuit to form a peak detector circuit and wherein there is additionally provided biasing means connected in series with said second diode for biasing off said diode sufficiently to permit conduction therethrough only during peaks of said modulation pulses.

5. In a radio frequency amplifier for modulated radio frequency carriers an electron discharge tube having a grid-cathode input circuit and an anode-cathode output circuit, an inductance element having high impedance takeoff and low impedance takeoff, means for coupling said inductance element to the output circuit of said discharge tube, a first diode connected in series with a first load circuit to form a demodulator combination, connections placing said demodulator combination across said inductance low impedance takeoff, a second diode connected in series with a second load circuit to form a peak detector combination, connections placing said peak detector combination across said inductance high impedance takeoff. biasing means in series with said second diode to bias said diode off to prevent conduction thereof for signals below a given amplitude, means for supplying signals to said discharge tube input circuit, and means responsive to the voltage across said second load circuit for adjusting the amplitude of signal applied to said discharge tube input circuit whereby to regulate the voltage developed across said first load circuit.

6. Apparatus according to claim 5 wherein said first and second diode are polarized to conduct current through said inductance in opposite directions from one another.

References Cited in the file of this patent

UNITED STATES PATENTS

| Number | Name | Date |
|---|---|---|
| 2,252,066 | Dallos | Aug. 12, 1941 |
| 2,254,855 | Poch | Sept. 2, 1941 |
| 2,259,520 | Freeman | Oct. 21, 1941 |
| 2,402,096 | Somers | June 11, 1946 |
| 2,498,839 | Hayward | Feb. 28, 1950 |

OTHER REFERENCES

"Electronics." November 1938, page 16 (from series of articles on Practical Design and Performance Considerations on Television Receivers by Engstrom and Holmes).

"Rider's Television Manual," vol. 4, November 25, 1949, pages cited: Sears Roebuck TV, pages 4–6; Starrett TV, pages 4–6; Westinghouse TV, pages 4–6.